United States Patent
Komoriya

(10) Patent No.: US 11,440,380 B2
(45) Date of Patent: Sep. 13, 2022

(54) FIXED WINDOW FOR VEHICLE

(71) Applicant: TOYOTA JIDOSHA KABUSHIKI KAISHA, Aichi-ken (JP)

(72) Inventor: Kazuki Komoriya, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 13 days.

(21) Appl. No.: 17/037,688

(22) Filed: Sep. 30, 2020

(65) Prior Publication Data

US 2021/0188055 A1    Jun. 24, 2021

(30) Foreign Application Priority Data

Dec. 23, 2019  (JP) .............................. JP2019-231671

(51) Int. Cl.
| | |
|---|---|
| *B60J 1/10* | (2006.01) |
| *B60J 10/20* | (2016.01) |
| *B60J 10/70* | (2016.01) |
| *B60J 1/00* | (2006.01) |

(52) U.S. Cl.
CPC ................ *B60J 1/10* (2013.01); *B60J 1/006* (2013.01); *B60J 10/20* (2016.02); *B60J 10/70* (2016.02)

(58) Field of Classification Search
CPC ..... B60J 1/10; B60J 10/20; B60J 10/70; B60J 1/006

USPC ............................................. 296/146.15, 201
See application file for complete search history.

(56) References Cited

U.S. PATENT DOCUMENTS

| | | | | |
|---|---|---|---|---|
| 2,625,715 | A * | 1/1953 | Beck ...................... | B60J 10/365 52/208 |
| 4,991,349 | A * | 2/1991 | Barthelemy ............... | B60J 1/10 49/504 |
| 7,080,874 | B2 * | 7/2006 | Farrar ...................... | B60J 1/007 296/146.15 |
| 10,794,109 | B2 * | 10/2020 | Takezoe ................... | B60J 1/004 |
| 2012/0133179 | A1 * | 5/2012 | Baroggi ................... | B60J 10/16 296/201 |

FOREIGN PATENT DOCUMENTS

JP            201694109 A      5/2016

* cited by examiner

*Primary Examiner* — D Glenn Dayoan
*Assistant Examiner* — Sunsurraye Westbrook
(74) *Attorney, Agent, or Firm* — Hauptman Ham, LLP

(57) ABSTRACT

A window member is joined to a surface of a window-opening peripheral edge on an inside of a vehicle cabin through an adhesive to cover a window opening. A dam member for separating the window-opening peripheral edge and the window member from each other at a predetermined interval is interposed between the window-opening peripheral edge and the window member. The dam member is set at a position closer to an inner peripheral end of the window-opening peripheral edge than a set position of the adhesive when viewed in a penetrating direction of the window opening.

4 Claims, 6 Drawing Sheets

FIXED WINDOW FOR VEHICLE

CROSS-REFERENCE TO RELATED APPLICATION

This application claims priority to Japanese Patent Application No. 2019-231671 filed on Dec. 23, 2019 incorporated herein by reference in its entirety.

BACKGROUND

1. Technical Field

The disclosure relates to a fixed window for a vehicle.

2. Description of Related Art

Japanese Patent Application Publication No. 2016-94109 discloses a technique related to a fixed window for a vehicle. Briefly, in the prior art, an opening for a window is formed in a panel such as a body of a vehicle, and the opening is covered with a resin window panel transparent from an outside of a vehicle cabin. An outer peripheral edge of a surface of the resin window panel on an inside of the vehicle cabin is disposed on an outer peripheral side of the opening and is fixed to a surface of the panel on the outside of the vehicle cabin with an adhesive.

SUMMARY

However, in the prior art, when an impact is applied to the resin window panel from the inside of the vehicle cabin, a load in a peeling direction acts on an adhesive portion between the panel such as the body and the resin window panel, so that there is room for improvement in preventing peeling of the resin window panel.

In view of the above fact, it is an object of the disclosure to provide a fixed window for a vehicle capable of preventing peeling of a window member when an impact is applied to the window member from an inside of a vehicle cabin.

A fixed window for a vehicle of the disclosure according to claim 1 includes a window-opening peripheral edge constituting a peripheral edge of a window opening provided in a vehicle; and a window member joined to a surface of the window-opening peripheral edge on the inside of a vehicle cabin through an adhesive to cover the window opening.

With the above configuration, the window member is joined to the surface of the window-opening peripheral edge on the inside of the vehicle cabin through the adhesive to cover the window opening. Therefore, when an impact is applied to the window member from the inside of the vehicle cabin, a load in a compression direction acts on an adhesive portion between the window-opening peripheral edge and the window member, thereby preventing peeling of the window member from the window-opening peripheral edge.

In the fixed window for the vehicle of the disclosure according to claim 2, in the configuration according to claim 1, a dam member for separating the window-opening peripheral edge and the window member from each other at a predetermined interval is interposed between the window-opening peripheral edge and the window member, and the dam member is set at a position closer to an inner peripheral end of the window-opening peripheral edge than a set position of the adhesive when viewed in a penetrating direction of the window opening.

With the above configuration, the dam member for separating the window-opening peripheral edge and the window member from each other at a predetermined interval is interposed between the window-opening peripheral edge and the window member, so that when an impact is applied to the window member from the inside of the vehicle cabin, the dam member also receives an impact load. Here, the dam member is set at a position closer to the inner peripheral end of the window-opening peripheral edge than the set position of the adhesive in the penetrating direction of the window opening. Therefore, when the window member is deflected by the impact applied to the window member from the inside of the vehicle cabin, a region of the window member corresponding to the dam member tends to deform more greatly than a region corresponding to the adhesive. Hence, the load acting on the dam member from the window member becomes larger than the load acting on the adhesive from the window member, leading to an effective reduction in the load acting on the adhesive from the window member.

In the fixed window for the vehicle of the disclosure according to claim 3, in the configuration according to claim 1 or 2, the window-opening peripheral edge includes an inner flange that constitutes a region of the window-opening peripheral edge on an inside of the vehicle cabin and is joined to a part of the window member through the adhesive, and an outer flange that constitutes a region of the window-opening peripheral edge on an outside of the vehicle cabin and is joined to the inner flange in a state of being superposed on the inner flange portion from the outside of the vehicle cabin. A weatherstrip is mounted on the inner peripheral end side of the window-opening peripheral edge to close a gap between respective tips of the inner flange and the outer flange, and the weatherstrip is provided with a gap placement portion disposed between the window-opening peripheral edge and the window member. A gap-filling portion for filling a gap between the gap placement portion and the window member is interposed between the gap placement portion and the window member.

With the above configuration, at the window-opening peripheral edge, the outer flange is joined to the inner flange in the state of being superposed on the inner flange portion from the outside of the vehicle cabin. Here, the inner flange and the outer flange are easily wetted due to being disposed closer to the outside of the vehicle cabin than the window member. However, the weatherstrip for closing the gap between the respective tips of the inner flange and the outer flange is mounted on the inner peripheral end side of the window-opening peripheral edge, and hence the weatherstrip prevents entry of water from between the inner flange and the outer flange.

The gap placement portion of the weatherstrip is disposed between the window-opening peripheral edge and the window member, and further, the gap-filling portion for filling the gap between the gap placement portion and the window member is interposed between the gap placement portion and the window member. Therefore, when an impact is applied to the window member from the inside of the vehicle cabin, a part of a load from the window member can be received by the gap-filling portion and the gap placement portion. Here, when the window member is deflected by the impact applied to the window member from the inside of the vehicle cabin, regions corresponding to the gap-filling portion and the gap placement portion of the window member tend to deform more greatly than the region corresponding to the adhesive. Hence, the provision of the gap-filling portion and the gap placement portion leads to an effective reduction in the load acting on the adhesive from the window member.

As described above, the fixed window for the vehicle of the disclosure has an excellent effect that, when an impact is applied to the window member from the inside of the vehicle cabin, the peeling of the window member is prevented.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

A fixed window for a vehicle according to a first embodiment of the disclosure will be described with reference to FIGS. 1 to 4. As for arrows appropriately illustrated in these figures, an arrow FR indicates a vehicle front side, an arrow UP indicates a vehicle upper side, and an arrow IN indicates an inside in the vehicle width direction. Hereinafter, when directions of front and rear, up and down, and right and left are used in the following description without special note, these represent front and rear in a vehicle front-rear direction, up and down in a vehicle-height direction, and right and left in the case of facing a vehicle traveling direction.

Figure 1:
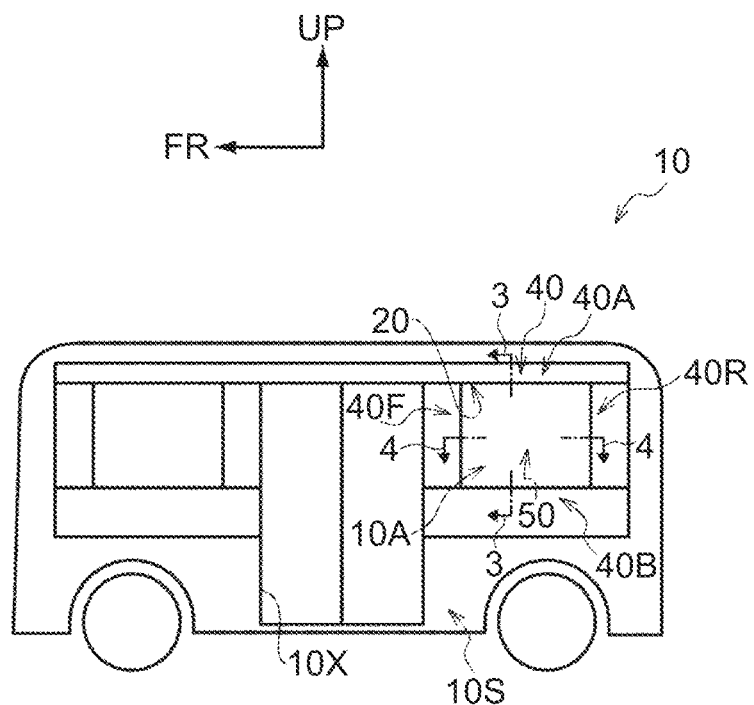
FIG. 1 is a side view schematically illustrating a vehicle to which a fixed window for a vehicle according to a first embodiment of the disclosure has been applied.

FIG. 1 is a schematic side view illustrating a vehicle 10 to which a fixed window 10A for a vehicle according to the embodiment has been applied. The vehicle 10 is a bus capable of automatic driving, and an entrance 10X is provided at an intermediate of a vehicle lateral portion 10S in a vehicle front-rear direction. The vehicle lateral portion 10S is provided with a fixed window 10A for the vehicle on a rear side of an upper half portion of the entrance 10X. Although the vehicle 10 is provided with a fixed window for the vehicle in addition to the fixed window 10A for the vehicle provided on the rear side of the upper half portion of the entrance 10X, a basic configuration of the fixed window for the vehicle is mostly the same as that of the fixed window 10A for the vehicle, and hence a detailed description thereof will be omitted.

Figure 2:
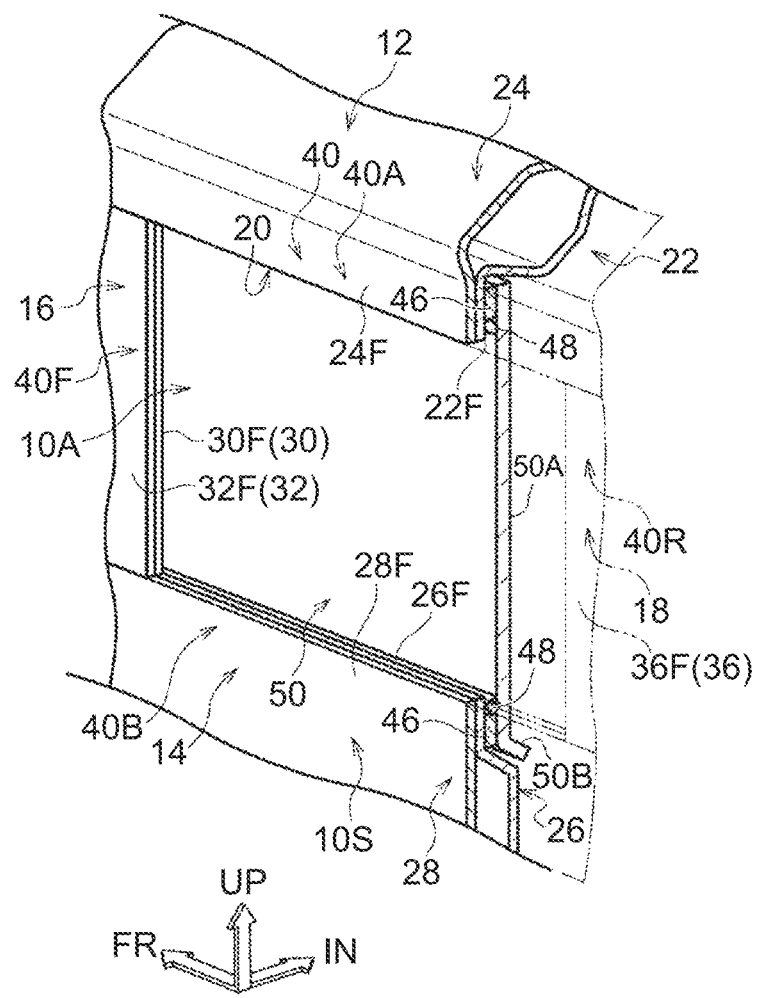
FIG. 2 is a schematic perspective view illustrating the fixed window for the vehicle of FIG. 1 in a state of being broken at its rear portion.

FIG. 2 is a schematic perspective view illustrating the fixed window 10A for the vehicle in a state of being broken at its rear portion. As illustrated in this figure, a first side rail 12 is disposed above the vehicle lateral portion 10S, and the first side rail 12 extends in the vehicle front-rear direction. A second side rail 14 is disposed on a vehicle lower side with respect to the first side rail 12, and the second side rail 14 extends in the vehicle front-rear direction. A first pillar 16 is erected to an upper side of the vehicle from the front of the second side rail 14, and an upper end of the first pillar 16 is connected to the first side rail 12. A second pillar 18 (indicated by a two-dot chain line in the figure) is disposed on a vehicle rear side with respect to the first pillar 16, and the second pillar 18 extends in the vehicle-height direction. An upper end of the second pillar 18 is connected to the first side rail 12, and a lower end of the second pillar 18 is connected to the second side rail 14.

Any of the first side rail 12, the second side rail 14, the first pillar 16, and the second pillar 18 has a closed section structure and constitutes a vehicle body frame member. A window opening 20 surrounded by the first side rail 12, the second side rail 14, the first pillar 16, and the second pillar 18 is formed in the vehicle lateral portion 10S. Note that "first" included in the name of the first side rail 12 and "second" included in the name of the second side rail 14 are provided only to distinguish the two side rails forming the window opening 20. Also, "first" included in the name of the first pillar 16 and the "second" included in the name of the second pillar 18 are provided only to distinguish the two pillars forming the window opening 20.

Figure 3:
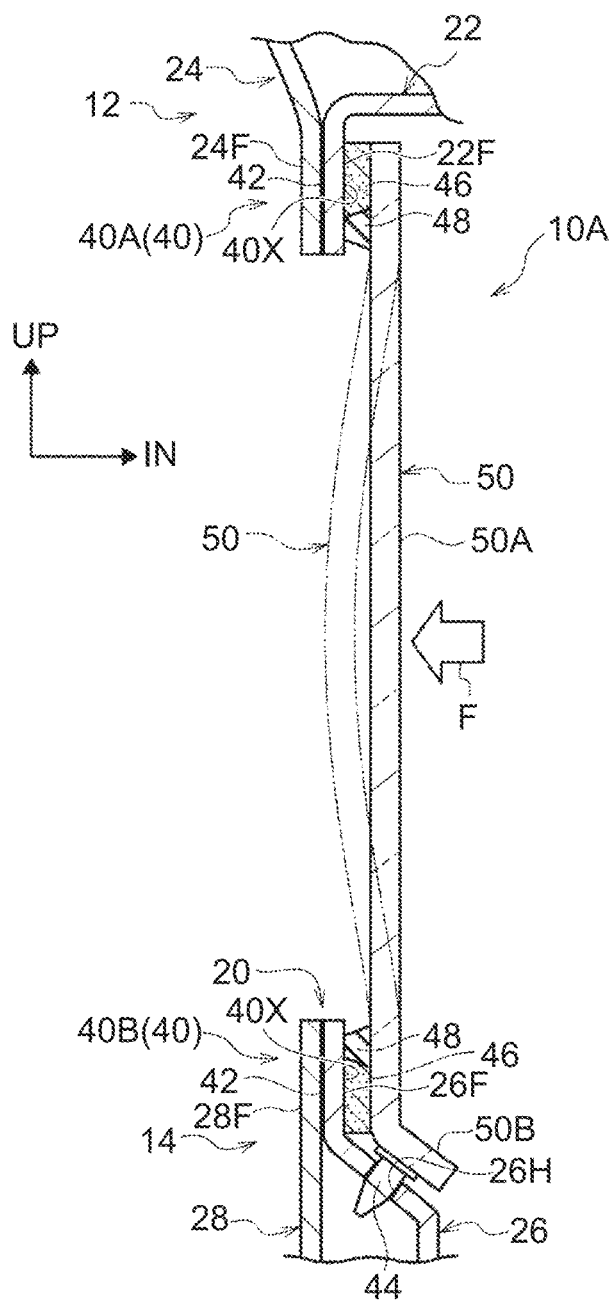
FIG. 3 is an enlarged longitudinal sectional view in which the fixed window is cut along line 3-3 in FIG. 1.

FIG. 3 illustrates an enlarged longitudinal sectional view in which the fixed window is cut along line 3-3 of FIG. 1. As illustrated in FIG. 3, the first side rail 12 includes a first side rail inner panel 22 (hereinafter abbreviated as "first side rail inner 22") disposed on the inside of the vehicle cabin, and a first side rail outer panel 24 (hereinafter abbreviated as "first side rail outer 24") disposed on the outside of the vehicle cabin with respect to the first side rail inner 22.

As illustrated in FIG. 2, the first side rail inner 22 is formed in an open sectional shape with the opening directed obliquely upward outward in the vehicle width direction in a longitudinal sectional view, and the first side rail outer 24 is formed in an open sectional shape with the opening directed obliquely downward inward in the vehicle width direction in the longitudinal sectional view. As illustrated in FIG. 3, an outer flange 24F constituting a lower end of the first side rail outer 24 is joined to an inner flange 22F constituting a lower end of the first side rail inner 22 while being superposed from the outside of the vehicle cabin. Flanges (not illustrated) provided on respective upper end sides of the first side rail inner 22 and the first side rail outer 24 are also joined to each other.

The second side rail 14 includes a second side rail inner panel 26 (hereinafter abbreviated as "second side rail inner 26") disposed on the inside of the vehicle cabin and a second side rail outer panel 28 (hereinafter abbreviated as "second side rail outer 28") disposed on the outside of the vehicle cabin with respect to the second side rail inner 26.

Although not illustrated in detail, the second side rail inner 26 is formed in an open sectional shape with the opening directed outward in the vehicle width direction in the longitudinal sectional view, and the second side rail outer 28 is formed in a substantially flat plate shape extending along the vehicle-height direction in the longitudinal sectional view. An outer flange 28F constituting an upper end of the second side rail outer 28 is joined to an inner flange 26F constituting an upper end of the second side rail inner 26 while being superposed from the outside of the vehicle cabin. Flanges (not illustrated) provided on respective lower end sides of the second side rail inner 26 and the second side rail outer 28 are also joined to each other.

Figure 4:
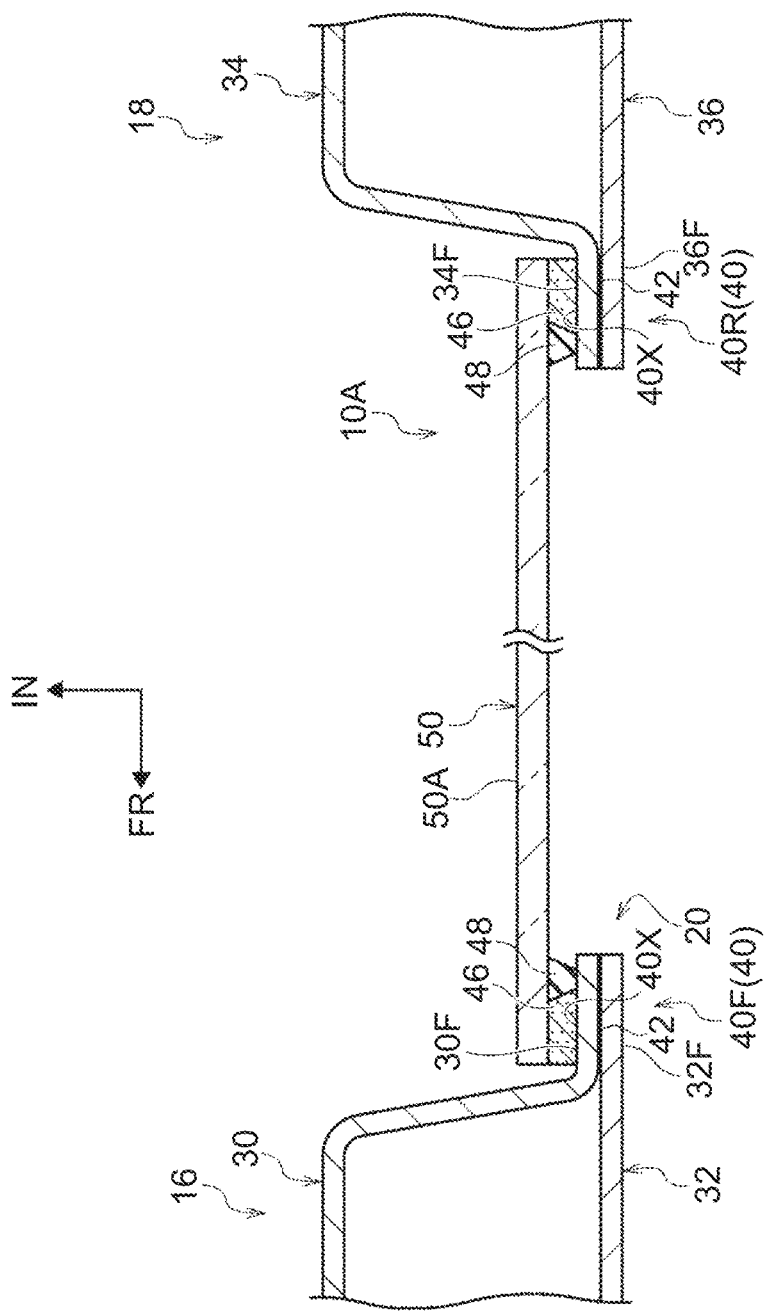
FIG. 4 is an enlarged sectional view in which the fixed window is cut along line 4-4 of FIG. 1.

FIG. 4 illustrates an enlarged sectional view in which the fixed window is cut along line 4-4 of FIG. 1. As illustrated in FIG. 4, the first pillar 16 includes a first pillar inner panel 30 (hereinafter abbreviated as "first pillar inner 30") disposed on the inside of the vehicle cabin and a first pillar outer panel 32 (hereinafter abbreviated as "first pillar outer 32") disposed on the outside of the vehicle cabin with respect to the first pillar inner 30.

Although not illustrated in detail, as an example, the first pillar inner 30 is formed in an open sectional shape with the opening directed outward in the vehicle width direction in a plane sectional view, and the first pillar outer 32 is formed in a substantially flat plate shape extending along the vehicle front-rear direction in the plane sectional view. An outer flange 32F constituting a rear end of the first pillar outer 32 is joined to an inner flange 30F constituting a rear end of the first pillar inner 30 while being superposed from the outside of the vehicle cabin. Flanges (not illustrated) provided on respective front-end sides of the first pillar inner 30 and the first pillar outer 32 are also joined to each other.

The second pillar 18 includes a second pillar inner panel 34 (hereinafter abbreviated as "second pillar inner 34") disposed on the inside of the vehicle cabin and a second pillar outer panel 36 (hereinafter abbreviated as "second pillar outer 36") disposed on the outside of the vehicle cabin with respect to the second pillar inner 34.

Although not illustrated in detail, the second pillar inner 34 is formed in a substantially L-shape in which the opening is directed obliquely rearward outward in the vehicle width direction at a portion excluding both ends in the plane sectional view, and the second pillar outer 36 is formed in a substantially L-shape in which the opening is directed obliquely forward inward in the vehicle width direction in the plane sectional view. An outer flange 36F constituting a front end of the second pillar outer 36 is joined to an inner flange 34F constituting a front end of the second pillar inner 34, while being superposed from the outside of the vehicle cabin. Flanges (not illustrated) provided on respective rear-end sides of the second pillar inner 34 and the second pillar outer 36 are also joined to each other.

Further, respective upper ends of the inner flange 30F of the first pillar inner 30 and the inner flange 34F of the second pillar inner 34 are joined by arc welding to the inner flange 22F of the first side rail inner 22 illustrated in FIG. 2 while the surfaces on the inside of the vehicle cabin are aligned with each other without any difference in level. Respective lower ends of the inner flange 30F of the first pillar inner 30 and the inner flange 34F of the second pillar inner 34 illustrated in FIG. 4 are joined by arc welding to the inner flange 26F of the second side rail inner 26 illustrated in FIG. 2 while the surfaces on the inside of the vehicle cabin are aligned with each other without any difference in level.

Further, respective upper ends of the outer flange 32F of the first pillar outer 32 and the outer flange 36F of the second pillar outer 36 illustrated in FIG. 4 are joined by arc welding to the outer flange 24F of the first side rail outer 24 illustrated in FIG. 2 while the surfaces on the outside of the vehicle cabin are aligned with each other without any difference in level. Respective lower ends of the outer flange 32F of the first pillar outer 32 and the outer flange 36F of the second pillar outer 36 illustrated in FIG. 4 are joined by arc welding to the outer flange 28F of the second side rail outer 28 illustrated in FIG. 2 while the surfaces on the outside of the vehicle cabin are aligned with each other without any difference in level.

In the embodiment, each of the first side rail outer 24, the second side rail outer 28, the first pillar outer 32, and the second pillar outer 36 is formed of rust-preventive steel plates.

In the embodiment, a window-opening peripheral edge 40 constituting the peripheral edge of the window opening 20 provided in the vehicle 10 illustrated in FIG. 1 has an upper portion 40A including the inner flange 22F of the first side rail inner 22 and the outer flange 24F of the first side rail outer 24 illustrated in FIG. 3. A lower portion 40B of the window-opening peripheral edge 40 includes the inner flange 26F of the second side rail inner 26 and the outer flange 28F of the second side rail outer 28.

As illustrated in FIG. 4, a front portion 40F of the window-opening peripheral edge 40 includes the inner flange 30F of the first pillar inner 30 and the outer flange 32F of the first pillar outer 32. Further, a rear portion 40R of the window-opening peripheral edge 40 includes the inner flange 34F of the second pillar inner 34 and the outer flange 36F of the second pillar outer 36.

As illustrated in FIGS. 3 and 4, on an inner peripheral edge side of the window opening 20, a seal portion 42 (simplified and indicated by a thick line in the figure) is provided to close gaps of respective joining portions between the inner flanges 22F, 26F, 30F, 34F and the outer flanges 24F, 28F, 32F, 36F at the window-opening peripheral edge 40. As an example, the seal portion 42 of the embodiment is a solidified adhesive. In FIG. 2, the seal portion 42 is not illustrated for making the figure easy to view.

As illustrated in FIGS. 3 and 4, a window member 50 is fixed to the window-opening peripheral edge 40. The window member 50 is made of transparent resin glass and formed in a panel shape, and is joined to a surface 40X of the window-opening peripheral edge 40 on the inside of the vehicle cabin through an adhesive 46 to cover the window opening 20. As the adhesive 46, a urethane-based adhesive can be applied. The surface 40X of the window-opening peripheral edge 40 on the inside of the vehicle cabin is formed by the surfaces of the inner flanges 22F, 26F, 30F, 34F on the inside of the vehicle cabin.

The window member 50 includes a main body 50A disposed with a portion in contact with the adhesive 46 as an outer periphery, and also includes an inclined extension 50B extending from a lower end of the main body 50A illustrated in FIG. 3 and inclined toward the vehicle cabin side toward the inside of the vehicle cabin side. The main body 50A is disposed with a penetrating direction of the window opening 20 as a thickness direction. A plurality of clips 44 for temporary fixing, arranged in the vehicle front-rear direction, are attached to the inclined extension 50B. The clip 44 is inserted into a mounting hole 26H formed through the second side rail inner 26. The mounting hole 26H is formed at a region lower than the inner flange 26F in the second side rail inner 26.

As illustrated in FIGS. 3 and 4, a dam member 48 for separating the window-opening peripheral edge 40 and the window member 50 from each other at a predetermined interval is interposed between the window-opening peripheral edge 40 and the window member 50. The dam member 48 is a rubber component having a predetermined thickness in a direction in which the window-opening peripheral edge 40 and the window member 50 face each other, and the dam member 48 is a member for ensuring a thickness of the adhesive 46 interposed between the window-opening peripheral edge 40 and the window member 50. The dam member 48 is set at a position closer to the inner peripheral end of the window-opening peripheral edge 40 than a set position of the adhesive 46 when viewed in the penetrating direction of the window opening 20. The dam member 48 is fixed to the window member 50 with a double-sided tape (not illustrated).

Operation and Effect

Next, the operation and effect of the embodiment will be described.

In the embodiment, the window member 50 is joined to the surface 40X of the window-opening peripheral edge 40 on the inside of the vehicle cabin through the adhesive 46 to cover the window opening 20. Therefore, when an impact is applied to the window member 50 from the inside of the vehicle cabin, a load in a compression direction acts on the adhesive portion (the placement portion of the adhesive 46) between the window-opening peripheral edge 40 and the window member 50, thereby preventing peeling of the window member 50 from the window-opening peripheral edge 40.

Further, in the embodiment, the dam member 48 for separating the window-opening peripheral edge 40 and the window member 50 from each other at a predetermined interval is interposed between the window-opening peripheral edge 40 and the window member 50, so that when an impact is applied to the window member 50 from the inside of the vehicle cabin, the dam member 48 also receives an impact load. Here, the dam member 48 is set at a position closer to the inner peripheral end of the window-opening peripheral edge 40 than the set position of the adhesive 46 in the penetrating direction of the window opening 20. Therefore, as illustrated in FIG. 3, when an impact load F is applied to the window member 50 from the inside of the vehicle cabin and the window member 50 is deflected so as to project to the outside of the vehicle cabin (cf. the window member 50 indicated by a two-dot chain line), a region of the window member 50 corresponding to the dam member 48 tends to deform more greatly than a region corresponding to the adhesive 46. Hence, the load acting on the dam member 48 from the window member 50 becomes larger than the load acting on the adhesive 46 from the window member 50, leading to an effective reduction in the load acting on the adhesive 46 from the window member 50.

As described above, according to the fixed window 10A for the vehicle of the embodiment, when an impact is applied to the window member 50 from the inside of the vehicle cabin, it is possible to prevent the peeling of the window member 50.

The inner flanges 22F, 26F, 30F, 34F and the outer flanges 24F, 28F, 32F, 36F of the window-opening peripheral edge 40 are easily wetted due to being disposed at positions closer to the outside of the vehicle cabin than the window member 50. However, in the embodiment, as a measure against wetting, the seal portion 42 is provided in the gaps of the respective joining portions between the inner flanges 22F, 26F, 30F, 34F and the outer flanges 24F, 28F, 32F, 36F. Hence, the seal portion 42 prevents entry of water from between the inner flanges 22F, 26F, 30F, 34F and the outer flanges 24F, 28F, 32F, 36F.

Second Embodiment

Figure 5:
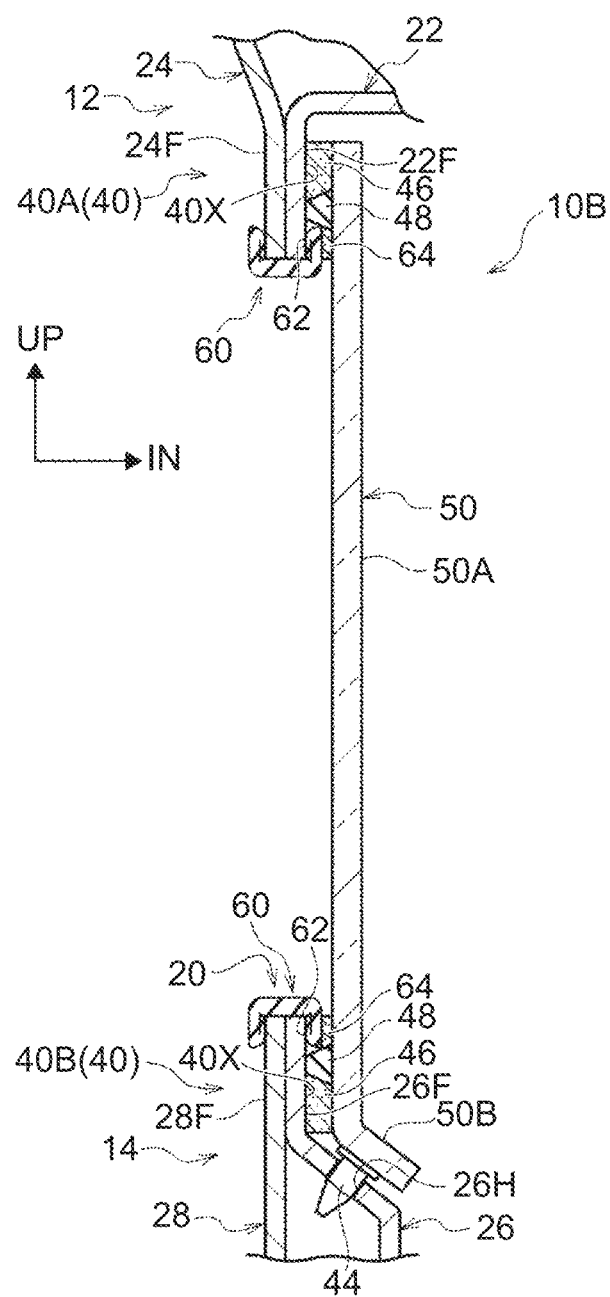
FIG. 5 is a longitudinal sectional view illustrating a fixed window for a vehicle according to a second embodiment of the disclosure.

Next, a fixed window for a vehicle according to a second embodiment of the disclosure will be described partially incorporating FIG. 4 while using FIG. 5. FIG. 5 illustrates a fixed window 10B for a vehicle according to the embodiment in a longitudinal sectional view (a view corresponding to FIG. 3 of the first embodiment.). As illustrated in this figure, the fixed window 10B for the vehicle differs from the fixed window 10A for the vehicle (see FIGS. 1 to 4) according to the first embodiment in terms of including a weatherstrip 60 and including a gap-filling portion 64 in place of the seal portion 42 (see FIGS. 3 and 4). The other configuration is substantially the same as that of the first embodiment. Thus, components substantially the same as those in the first embodiment are denoted by the same reference numerals, and description thereof will be omitted.

The weatherstrip 60 is mounted on the inner peripheral end side of the window-opening peripheral edge 40. The weatherstrip 60 closes gaps between respective tips of the inner flanges 22F, 26F and the outer flanges 24F, 28F. Although not illustrated, the weatherstrip 60 closes gaps between respective tips of the inner flanges 30F, 34F (see FIG. 4) and the outer flanges 32F, 36F (see FIG. 4).

The weatherstrip 60 sandwiches tip sides of the inner flanges 22F, 26F, 30F, 34F (see FIG. 4 for reference numerals 30F, 34E) and tip sides of the outer flanges 24F, 28F, 32F, 36F (see FIG. 4 for reference numerals 32F, 36F.). The weatherstrip 60 includes a gap placement portion 62 disposed between the window-opening peripheral edge 40 and the window member 50. The gap-filling portion 64 for filling a gap between the gap placement portion 62 and the window member 50 is interposed between the gap placement portion 62 and the window member 50. As an example, the gap-filling portion 64 is a solidified adhesive.

According to the embodiment as well, similarly to the first embodiment described above, when an impact is applied to the window member 50 from the inside of the vehicle cabin, a load in a compression direction acts on the adhesive portion between the window-opening peripheral edge 40 and the window member 50, thereby preventing peeling of the window member 50 from the window-opening peripheral edge 40.

In the embodiment, the weatherstrip 60 prevents entry of water from between the inner flanges 22F, 26F, 30F, 34F (see FIG. 4 for reference numerals 30F and 34F.) and the outer flanges 24F, 28F, 32F, 36F (see FIG. 4 for reference numerals 32F and 36F).

In the embodiment, when an impact is applied to the window member 50 from the inside of the vehicle cabin, a part of a load from the window member 50 can be received by the gap-filling portion 64 and the gap placement portion 62. Here, when the window member 50 is deflected by the impact applied to the window member 50 from the inside of the vehicle cabin, regions corresponding to the gap-filling portion 64 and the gap placement portion 62 of the window member 50 tend to deform more greatly than the region corresponding to the adhesive 46. Hence, the provision of the gap-filling portion 64 and the gap placement portion 62 leads to an effective reduction in the load acting on the adhesive 46 from the window member 50.

Third Embodiment

Figure 6:
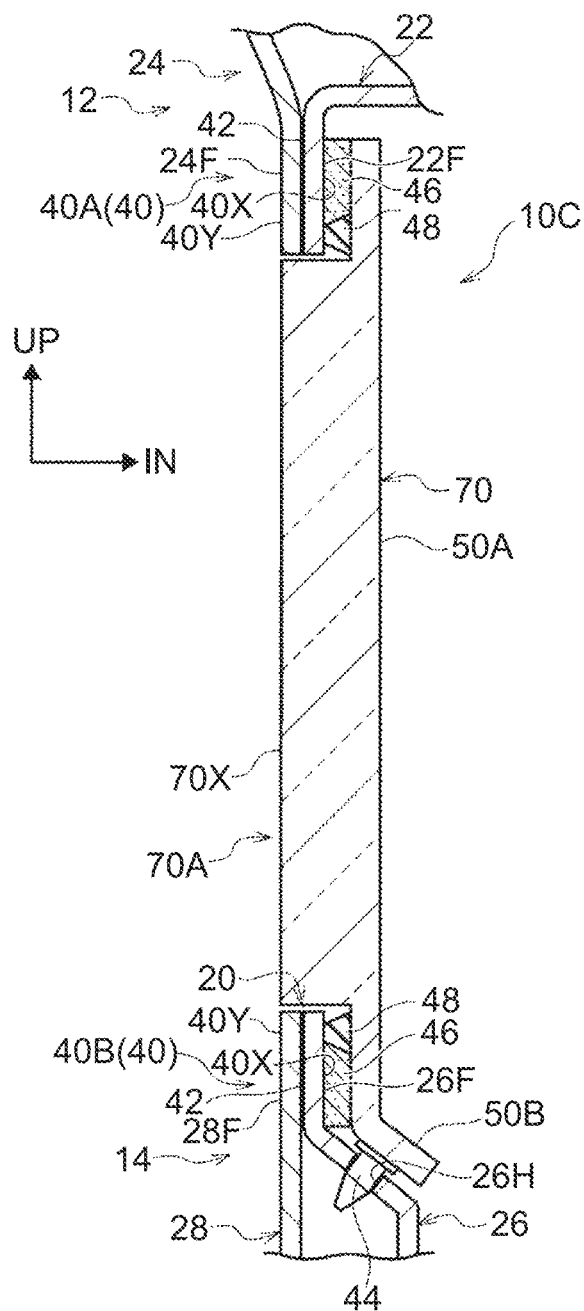
FIG. 6 is a longitudinal sectional view illustrating a fixed window for a vehicle according to a third embodiment of the disclosure.

Next, a fixed window for a vehicle according to a third embodiment of the disclosure will be described with reference to FIG. 6. In FIG. 6, a fixed window 10C for a vehicle according to the embodiment is illustrated in a longitudinal sectional view (a view corresponding to FIG. 3 of the first embodiment). As illustrated in this figure, the fixed window 10C for the vehicle differs from the fixed window 10A for the vehicle (see FIGS. 1 to 4) according to the first embodiment in including a window member 70 in place of the window member 50 (see FIGS. 3 and 4). The other configuration is substantially the same as that of the first embodiment. The window member 70 has substantially the same configuration as that of the window member 50 of the first embodiment (see FIGS. 3 and 4) except for points to be described below. Thus, components substantially the same as those in the first embodiment are denoted by the same reference numerals, and description thereof will be omitted.

The window member 70 is provided with a projection 70A projecting toward a space on an inner peripheral side of the window opening 20 from a region excluding an outer peripheral side portion (more specifically, a region to which the adhesive 46 and the dam member 48 are fixed and a region in the vicinity thereof) of the main body 50A. As an example, a surface 70X of the projection 70A on the outside of the vehicle cabin is aligned with a surface 40Y of the window-opening peripheral edge 40 on the outside of the vehicle cabin.

According to the embodiment, substantially the same operation and effect as those of the first embodiment can be obtained. Further, in the embodiment, a surface 70X of the projection 70A of the window member 70 on the outside of the vehicle cabin is aligned with the surface 40Y of the window-opening peripheral edge 40 on the outside of the vehicle cabin, whereby design appearance when viewed from the outside of the vehicle is improved.

Supplementary Description of Embodiments

As a modification of the first to third embodiments illustrated in FIGS. 1 to 6, the window member may be made of inorganic glass.

As a modification of the first to third embodiments, the window-opening peripheral edge may be made of one material or may be formed such that a frame made of one material constitutes a region on the inside of the vehicle cabin.

As a modification of the first to third embodiments, it is possible to adopt a configuration in which the set position of the adhesive for joining the window-opening peripheral edge and the window member, as viewed in the penetrating direction of the window opening, is a position closer to the inner peripheral end of the window-opening peripheral edge than the set position of the dam member. As another modification, it is also possible to adopt a configuration in which the dam member is not interposed between the window-opening peripheral edge and the window member.

Further, in the first to third embodiments, each of the members (i.e., the first side rail inner 22, the second side rail inner 26, the first pillar inner 30, and the second pillar inner 34) provided with the inner flanges 22F, 26F, 30F, 34F may be formed of a rust-preventive steel plate. In this case, it is also possible to adopt, for example, a configuration in which the seal portion 42 of the first and third embodiments is not provided and a configuration in which the weatherstrip 60 or the gap-filling portion 64 of the second embodiment is not provided.

As a modification of the first and third embodiments, it is also possible to adopt a configuration in which the seal portion 42 is not provided, the dam member is provided with an extension extended from between the window-opening peripheral edge 40 and the window member 50, 70 to a side opposite to the adhesive 46 side and bent to the outside of the vehicle cabin, and the extension is disposed on the inner peripheral edge side of the window opening 20 to close the gaps between the respective tips of the inner flange 22F, 26F, 30F, 34F and the outer flange 24F, 28F, 32F, 36F.

As a modification of the second embodiment, the gap-filling portion interposed between the gap placement portion 62 and the window member 50 to fill the gap between the gap placement portion 62 and the window member 50 may include, for example, a gap filling member made of rubber.

Further, in the first to third embodiments, the vehicle 10 to which the fixed windows 10A, 10B, 10C for the vehicle are applied has been an automatable bus, but the vehicle to which the fixed window for the vehicle is applied may be a vehicle not capable of automatic driving or vehicles except for a bus.

Note that the embodiments and modifications described above can be implemented in an appropriate combination.

Although an example of the disclosure has been described above, the disclosure is not limited to the above, and it is needless to say that the disclosure can be carried out in various modifications within a range not deviating from the gist thereof.

What is claimed is:

1. A fixed window for a vehicle, the fixed window comprising:
    a window-opening peripheral edge defining a peripheral edge of a window opening provided in a vehicle, the window-opening peripheral edge including
        an inner flange, and
        an outer flange superposed on and joined to a first surface of the inner flange from an outer side of the vehicle;
    a window member joined to a second surface of the inner flange of the window-opening peripheral edge to cover the window opening; and
    an adhesive interposed between a surface of the window member and the second surface of the inner flange to directly join the surface of the window member to the second surface of the inner flange.

2. The fixed window for the vehicle according to claim 1, further comprising:
    a dam member separating the window-opening peripheral edge and the window member from each other at a predetermined interval and interposed between the window-opening peripheral edge and the window member, wherein
    the dam member is set at a position closer to an inner peripheral end of the window-opening peripheral edge than a set position of the adhesive when viewed in a penetrating direction of the window opening.

3. A fixed window for a vehicle, the fixed window comprising:
    a window-opening peripheral edge constituting a peripheral edge of a window opening provided in a vehicle; and
    a window member joined to a surface of the window-opening peripheral edge on an inside of a vehicle cabin through an adhesive to cover the window opening, wherein
    the window-opening peripheral edge includes:
        an inner flange that constitutes a region of the window-opening peripheral edge on an inside of the vehicle cabin and is joined to a part of the window member through the adhesive, and
        an outer flange that constitutes a region of the window-opening peripheral edge on an outside of the vehicle cabin and is joined to the inner flange in a state of being superposed on the inner flange portion from the outside of the vehicle cabin,
    a weatherstrip is mounted on the inner peripheral end side of the window-opening peripheral edge to close a gap between respective tips of the inner flange and the outer flange, and
    the weatherstrip is provided with a gap placement portion disposed between the window-opening peripheral edge and the window member, and a gap-filling portion for filling a gap between the gap placement portion and the window member is interposed between the gap placement portion and the window member.

4. The fixed window for the vehicle according to claim 1, wherein
- the inner flange defines a first region of the window-opening peripheral edge on an inner side of the vehicle and is joined to a part of the window member through the adhesive, and
- the outer flange defines a second region of the window-opening peripheral edge on the outer side of the vehicle,
- a weatherstrip is mounted on an inner peripheral end side of the window-opening peripheral edge to close a first gap between respective tips of the inner flange and the outer flange, and the weatherstrip is provided with a gap placement portion disposed between the window-opening peripheral edge and the window member, and
- a gap-filling portion filling a second gap between the gap placement portion and the window member is interposed between the gap placement portion and the window member.

* * * * *